United States Patent
Pezeshki-Esfahani

(10) Patent No.: US 6,711,176 B1
(45) Date of Patent: Mar. 23, 2004

(54) CELL/FRAME ATM INTERWORKING

(75) Inventor: Hossain Pezeshki-Esfahani, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/400,836

(22) Filed: Sep. 21, 1999

(51) Int. Cl.$^7$ .................................................. H04J 3/24
(52) U.S. Cl. ........................ 370/466; 370/467; 370/474
(58) Field of Search ............................... 370/231, 236.1, 370/352–355, 464–467, 474, 470–471, 476, 469, 473, 395.65

(56) References Cited

U.S. PATENT DOCUMENTS

| | | | |
|---|---|---|---|
| 5,537,408 A | * | 7/1996 | Branstad et al. ............. 370/473 |
| 5,751,951 A | * | 5/1998 | Osborne et al. ............. 709/250 |
| 5,867,509 A | * | 2/1999 | Tanaka ........................ 714/758 |
| 6,028,861 A | * | 2/2000 | Soirinsuo et al. ........... 370/225 |
| 6,295,532 B1 | * | 9/2001 | Hawkinson .................... 707/4 |
| 6,317,433 B1 | * | 11/2001 | Galand et al. ........... 370/395.2 |
| 6,414,939 B1 | * | 7/2002 | Yamato .................... 370/236.1 |

OTHER PUBLICATIONS

ATM Forum Technical Committee, "Frame Based User-To-Network Interface (FUNI) Specification v2.0", Document No. AF-SAA-0088.000, Jul., 1997.
"Frame Relay/ATM PVC Network Interworking Implementation Agreement", FRF .5, Dec. 20, 1994, 17 pages.
"Frame Relay Fragmentation Implementation Agreement", FRF.12, Dec., 1997, 24 pages.

* cited by examiner

*Primary Examiner*—Seema S. Rao
*Assistant Examiner*—Ron Abelson
(74) *Attorney, Agent, or Firm*—Marks & Clerk

(57) ABSTRACT

The method for converting cell-based ATM traffic to frame-based ATM traffic comprises assembling a group of one or more cells of a input cell stream which corresponds to an AAL5 PDU; extracting a user data payload of the AAL5 PDU, exclusive of any padding; constructing a frame-based ATM adaptation layer protocol data unit (FB-AAL PDU) having no padding using the AAL5 PDU payload; and segmenting the FB-AAL PDU into one or more frames to generate an output frame stream. The method provides an increase in bandwidth efficiency since the padding overhead required by AAL5 PDUs is eliminated when transferring data to, over or across a frame-based ATM network.

17 Claims, 2 Drawing Sheets

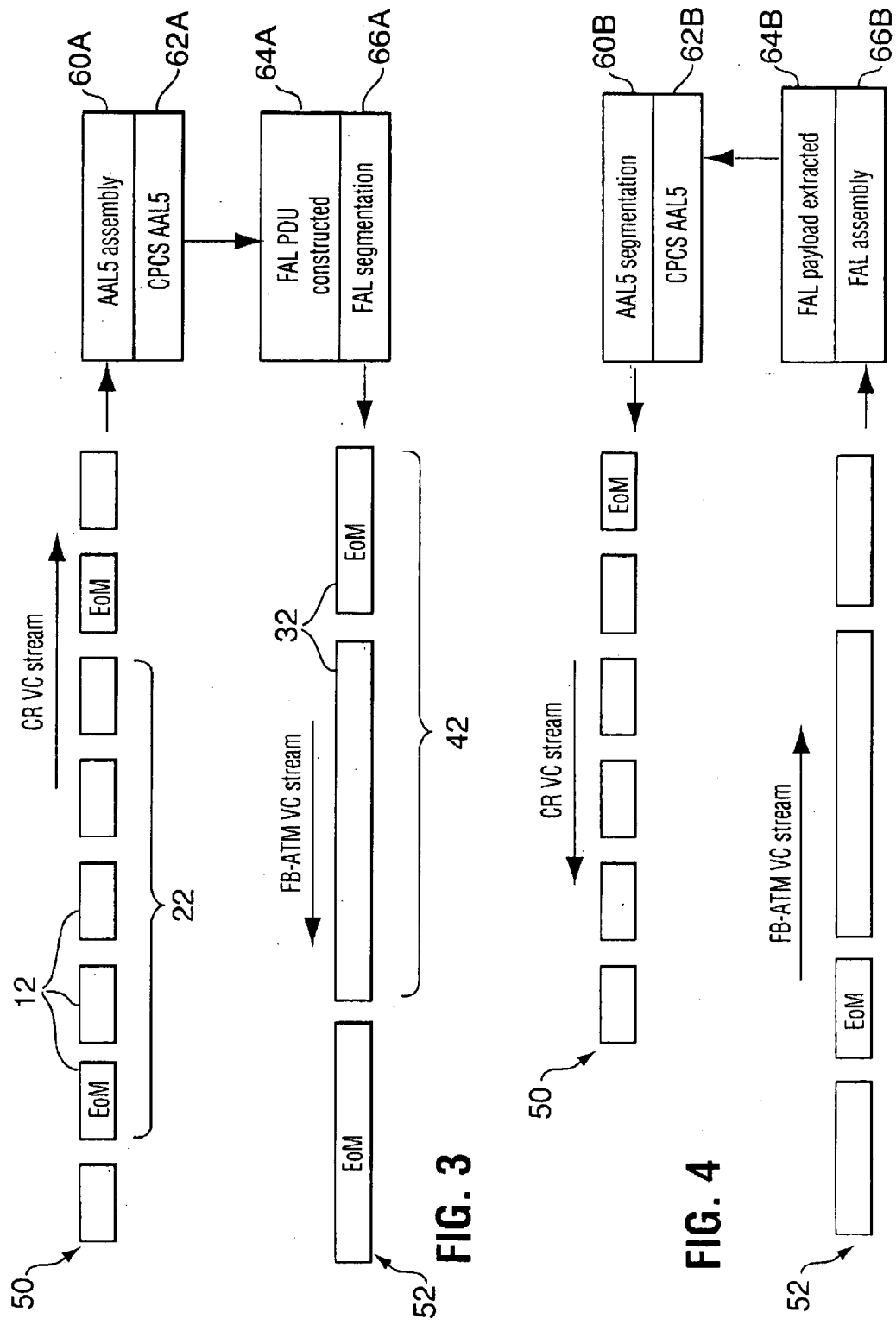

CELL/FRAME ATM INTERWORKING

FIELD OF INVENTION

The invention relates to a method and apparatus for inter-operating or interworking a cell-based ATM network with a frame-based ATM network.

BACKGROUND OF INVENTION

Frame-based asynchronous transfer mode (FB-ATM) protocols are currently under development by organizations such as the ATM Forum. FR-ATM differs from the presently well defined cell-relay ATM (CR-ATM) protocols in that the former will employ a variable length frame as the basic unit of data transport whereas the latter employs fixed size cells. An interworking function will be required for seamlessly transporting data between CR-ATM networks and FR-ATM networks.

The CR-ATM protocol is layered or stacked as set forth for instance in the B-ISDN protocol stack described in CCIT Recommendations I.362 and I.363. The protocol includes an ATM adaptation layer (AAL) for adapting the services of the connection orientated ATM Layer to those required by higher layers (commonly referred to as AAL users). Some versions of the AAL operate by receiving user data, such as an Internet Protocol (IP) or Frame Relay (FR) packet, constructing an AAL common part convergence sub-layer protocol data unit (CPCS-PDU—hereinafter referred to as "AAL PDU") based on this data, and segmenting the AAL PDU into plural segmentation and re-assembly protocol data units (SAR PDUs) that form the payload of the transportable fixed-size ATM cell. The AAL also functions in the reverse direction to convert plural SAR PDUs into an AAL PDU. The emerging FB-ATM protocol will likely also be stacked in a manner similar to CR-ATM and include an AAL (hereinafter FB-AAL) equivalent to the CR-ATM AAL.

One intuitive approach to interworking when data originates and terminates in a CR-ATM network and is transferred across an intermediary FB-ATM network is to assemble a series of fixed size ATM cells which collectively correspond to a CR-ATM AAL PDU. This assembly of cells could form the input to the FB-AAL. Conversely, an assembly of FB-ATM frames could form the AAL PDU for segmentation and data transfer across a CR-ATM network. Such an approach is, however, not optimally efficient with respect to the conservation of bandwidth.

SUMMARY OF INVENTION

Broadly speaking, the invention provides a method of interworking between cell-based and frame-based ATM networks.

According to one aspect of the invention, a method is provided for converting cell-based ATM traffic to frame-based ATM traffic. The method comprises (a) aggregating a group of one or more cells of an input cell stream which corresponds to an AAL, preferably AAL5, PDU; (b) extracting from the cell group a user data payload of the AAL5 PDU, exclusive of any AAL PDU padding; (c) constructing a frame-based ATM adaptation layer protocol data unit (FB-AAL PDU) having no padding using the AAL PDU payload; and (d) segmenting the FB-AAL PDU into one or more frames to generate an output frame stream. The method provides an increase in bandwidth efficiency since the padding overhead required by AAL5 PDUs is eliminated when transferring data to, over or across FB- ATM.

According to another aspect of the invention, a method is provided for converting frame-based ATM traffic to cell-based ATM traffic. The method comprises (a) assembling a group of one or more frames of an input frame stream which corresponds to a FB-AAL PDU; (b) extracting from the frame group a user data payload of the FB-AAL PDU; (c) constructing a CR-ATM AAL PDU using the FB-AAL PDU payload; and (d) segmenting the CR-ATM AAL PDU into one or more cells to generate an output cell stream.

Another more general aspect of the invention provides a method for converting a stream of fixed size packets to a stream of variable sized packets in circumstances where the variable sized packets have a maximum size limit. The method comprises: (a) assembling a group of one or more fixed size packets wherein a last packet of the group includes padding for the purposes of aligning a user data payload for transport over the group of packets; (b) extracting the user data payload from the group of fixed size packets, exclusive of the padding; and (c) segmenting the user data payload into one or more variable sized packets to generate the variable sized packet stream.

Interworking apparatus for effecting the above methods is also disclosed.

BRIEF DESCRIPTION OF DRAWINGS

The foregoing and other aspects of the invention will become more apparent from the following description of the preferred embodiments thereof and the accompanying drawings which illustrate, by way of example only, the principles of the invention. In the drawings:

FIG. 3 is a schematic diagram of various processing layers employed in an interworking function in the CR-ATM to FB-ATM direction in accordance with the preferred embodiment; and FIG. 4 is a schematic diagram of various processing layers employed in an interworking function in the FB-ATM to CR-ATM direction in accordance with the preferred embodiment.

DETAILED DESCRIPTION OF PREFERRED EMBODIMENTS

Figure 1A:
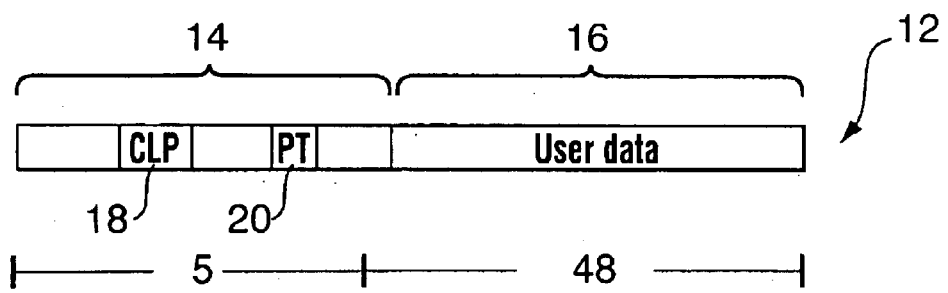
FIG. 1A is a diagram of the logical structure of a CR-ATM cell.

FIG. 1A shows the structure of a CR-ATM cell 12. The cell 12 comprises a 5 octet header 14 and a 48 octet data payload 16 for a fixed total size of 53 octets. The header 14 includes a cell loss priority (CLP) field 18 for indicating the priority level of the cell as well known in the art. The header 14 also includes a PT field 20, the use of which is discussed in greater detail below.

Figure 1B:
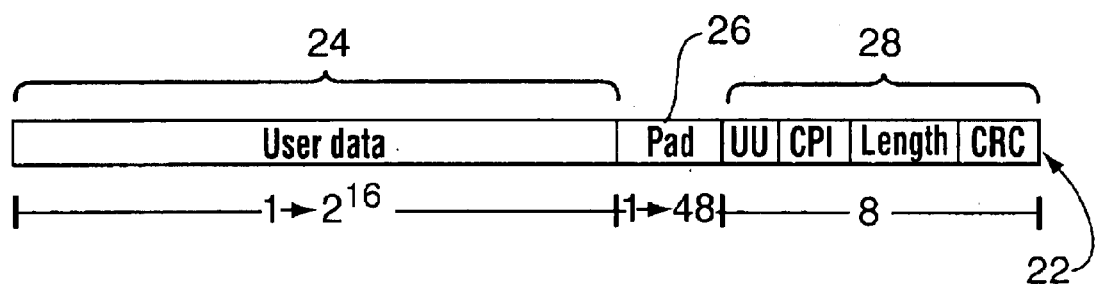
FIG. 1B is a diagram of the logical structure of a CR-ATM AAL5 PDU.

FIG. 1B shows the structure of an AAL PDU 22 in accordance with AAL5, a predominant version of the AAL. The AAL5 PDU 22 comprises a variable sized user data payload 24, a variable sized padding field 26, and a trailer 28. AAL5 sizes the padding field 14 such that the size (in octets) of the entire AAL5 PDU 22 is an exact multiple of 48. This enables the AAL5 PDU 22 to be directly segmented into cell payloads 16 (FIG. 1A), which correspond to AAL5 SAR-PDUs.

A CR-ATM virtual circuit (VC) stream 50 is shown in FIG. 3. It will be noted that each AAL5 PDU is carried by plural cells 12. The last cell of a group of a cells which corresponds to an AAL5 PDU has its PT field 20 set to delineate the boundary of the PDU. This cell is labeled as the EoM (end of message) cell in FIG. 3.

Figure 2A:
FIG. 2A is a diagram of the logical structure of a FB-ATM frame.

FIG. 2A shows the structure of a contemplated FR-ATM frame 32. The frame 32 comprises a header 34 and a variable sized data payload 36. At the present time it is contemplated for the frame 32 to have a maximum permissible size Lmax. See Section 3.4 of ATM Forum Technical Committee, "Frame Based User-To-Network Interface (FUNI)" Specification v2.0, AF-SAA0088. 00, Jul. 1997, which is incorporated by reference herein in its entirety. The header 34 includes a frame loss priority (FLP) field 38 and a payload type (PT) field 40 which are respectively intended to function in a manner similar to the CLP field 18 and PT field 20 of CR-ATM cell 10.

Figure 2B:
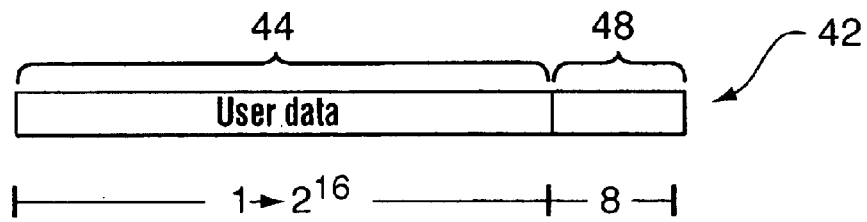
FIG. 2B is a diagram of the logical structure of a FB-ATM AAL PDU.

FB-ATM contemplates an equivalent to AAL, which is termed herein as FB-AAL. The FB-AAL, as with AAL5, includes an FB-AAL PDU construction function or sub-layer for receiving and encapsulating data from AAL users. FIG. 2B shows the structure of a contemplated FB-AAL PDU 42, which comprises a variably sized user data payload 44 and a trailer 48. The PDU 42 does not require a padding field of any kind since the FB-ATM frame 32 comprises a variably sized payload 36. Nevertheless, due to the limitation on the maximum permissible size of frame 32, the FB-AAL will require a segmentation function or sub-layer to segment PDU 42 across $$N = \left\lceil \frac{size(user\ data) + 8}{Lmax - 4} \right\rceil$$

frames 32. The details of the segmentation and re-assembly state machines for FB-AAL will be analogous to those for AAL5/CR-ATM.

An FB-ATM VC stream 52 is also shown in FIG. 3. It will be noted that each FB-ATM PDU 42 is carried by one or more frames 32. The PT field 40 of the last frame of a PDU 42 is set in order to delineate PDU boundaries. This frame is labeled as the EoM (end of message) cell in FIG. 3.

The preferred embodiment employs a "store-and-forward" method for FB-AAL/FB-ATM inter-operability with AAL5/CR-ATM. FIG. 3 illustrates the processing layers in the CR-ATM to FB-ATM direction and FIG. 4 illustrates the processing layers in the FB-ATM to CR-ATM direction.

Referring to FIG. 3, the preferred method for interworking in the CR-ATM to FB-ATM direction comprises the following steps:

1. An AAL5 assembly function 60A as well known in the art is implemented to extract each AAL5 PDU 22 from the CR-ATM VC stream 50. The extraction operation for a given AAL5 PDU terminates upon receipt of the corresponding EoM cell.
2. The payload 24 of the AAL5 PDU 22 is extracted. This operation is performed by an extraction function 62A of the AAL5 common part convergence sub-layer (CPCS). Note that the payload 24 does not include the padding field 26.
3. The AAL5 PDU payload 24 is passed onto the FB-AAL which, as described above, includes an FB-ATM PDU construction function 64A and an FB-ATM SDU or frame segmentation/function 66A. The FB-AAL encapsulates the AAL5 PDU payload 24 or user data, absent any padding, within an FB-AAL PDU 42 structure and segments the PDU 42 as necessary to generate an emerging FB-ATM VC frame stream 52.

Thus each AAL5 PDU results in exactly one FB-AAL PDU being constructed as shown in FIG. 3.

If one of the cells being assembled has its CLP field 18 set to 1 (indicating low priority), then all resulting FB-ATM frames 32 have their FLP fields 40 set to 1 (to indicate low priority).

Additionally, in the event the CR-ATM VC stream 50 includes resource management (RM) cells, such cells bypass the segmentation and re-assembly functions described above. Instead, each RM cell is directly passed to the FB-AAL sub-layer 64 to be encapsulated in an individual frame 32 (with the header 34 appropriately set) and then inserted into the emerging frame stream 52.

Referring to FIG. 4, the preferred method for interworking in the FB-ATM to CR-ATM direction comprises the following steps:

1. An FB-AAL assembly function 66 as described above is implemented to extract each FB-AAL PDU 42 from FB-ATM VC frame stream 52. The extraction operation for a given FB-AAL PDU 42 terminates upon receipt of the corresponding EoM.
2. The payload 44 of the FB-AAL PDU 42 is extracted. This is preferably accomplished by an extraction function 62B of the FB-AAL.
3. The FB-AAL PDU payload 44 is passed to the AAL5 which, as known in the art, includes an AAL5 PDU construction function 62B in the CPCS and an AAL5 SDU or cell segmentation function 66A. The AAL5 encapsulates the FB-AAL PDU payload 44 or user data within an AAL5 PDU structure 22 and segments the PDU 22 as necessary to generate an emerging CR-ATM VC cell stream 50.

If one of the arriving frames has its FLP field 40 set to 1, all resulting cells have their CLP fields 18 set to 1. Each frame marked as RM bypasses the segmentation and re-assembly functions described above. Instead, each such frame is converted to a single ATM cell and inserted into the emerging CR-ATM VC cell stream 50.

The key benefit achieved from the above described interworking method is an increase in bandwidth efficiency since the padding overhead required by AAL5 PDUs are eliminated when transferring data to, over or across FB-ATM. On the negative side, the interoperability functions are "store-and-forward" in nature and therefore incur delay and require increased storage.

Those skilled in the art will appreciate that numerous modifications and variations may be made to the preferred embodiment without departing from the spirit and scope of the claims.

What is claimed is:

1. A method for converting cell-based ATM traffic to frame-based ATM traffic, comprising:
    assembling a group of one or more cells of a input cell stream wherein said cell group corresponds to an ATM adaptation layer protocol data unit (AAL PDU);
    extracting from said cell group a user data payload of the AAL PDU, exclusive of any AAL PDU padding;
    constructing a frame-based ATM adaptation layer protocol data unit (FB-AAL PDU) having no padding using said AAL PDU payload; and
    segmenting said FB-AAL PDU into a plurality of frames to generate an FB-ATM variable length frame stream.

2. The method according to claim 1, wherein said AAL PDU is an AAL5 PDU which comprise a padding field.

3. A method for converting frame-based ATM traffic to cell-based ATM traffic comprising:

assembling a group of variable length frames of an input frame stream which corresponds to a frame-based ATM adaptation layer protocol data unit (FB-AAL PDU);

extracting from said frame group a user data payload of said FB-AAL, PDU;

constructing an ATM adaptation layer protocol data unit (AAL PDU) using said FB-AAL PDU payload; and segmenting said AAL PDU into plurality of cells to generate an output cell stream.

4. A method for interworking cell-based ATM traffic, comprising (1) converting an input cell steam into an output frame stream by
 (a) assembling a group of cells of said input cell stream which correspond to an ATM adaptation layer 5 protocol data unit (AAL5 PDU),
 (b) extracting from said cell group a user data payload of the AAL5 PDU, exclusive of any AAL5 PDU padding,
 (c) constructing a frame-based ATM adaptation layer protocol data unit (FB-AAL PDU) having no padding using said AAL5 PDU payload, and
 (d) segmenting said FB-AAL PDU into a plurality of variable length frames to generate said output frame stream; and (2) converting an input frame stream into an output cell stream by
 (e) aggregating a group of variable length frames of said input frame stream which corresponds to a FB-AAL PDU,
 (f) extracting from said frame group a user data payload of said FB-AAL PDU,
 (g) constructing an AAL5 PDU using said FB-AAL PDU payload, and
 (h) segmenting said AAL5 PDU into a plurality of cells to generate said output cell stream.

5. Apparatus for converting cell-based ATM traffic to frame-based ATM traffic, comprising:

means for assembling a group of cells of a input cell stream wherein said cell group corresponds to an ATM adaptation layer protocol data unit (AAL PDU);

means for extracting from said cell group a user data payload of the AAL PDU, exclusive of any AAL PDU padding;

means for constructing a frame-based ATM adaptation layer protocol data unit (FB-AAL PDU) having no padding using said AAL PDU payload; and means for segmenting said FB-AAL PDU into a plurality of variable length frames to generate an FB-ATM output frame stream.

6. The apparatus according to claim 5, wherein said AAL PDU is an AAL5 PDU which comprises a padding field.

7. Apparatus for convening frame-based ATM traffic to cell-based ATM traffic comprising:

means for assembling a group of variable length frames of an input frame stream which corresponds to a frame-based ATM adaptation layer protocol data unit (FB-AAL PDU);

means for extracting from said frame group a user data payload of said FB-AAL PDU;

means for constructing an ATM adaptation layer protocol data unit (AAL PDU) using said FB-AAL PDU payload; and means for segmenting said AAL PDU into a plurality of cells to generate an output cell stream.

8. Apparatus for interworking cell-based ATM traffic and frame-based ATM traffic, comprising:

(1) means for convening an input cell stream into an output FB-ATM frame stream by
 (a) assembling a group of cells of said input cell stream which correspond to an ATM adaptation layer 5 protocol data unit (AAL5 PDU),
 (b) extracting from said cell group a user data payload of the AAL5 PDU, exclusive of any AAL5 PDU padding,
 (c) constructing a frame-based ATM adaptation layer protocol data unit (FB-AAL PDU) having no padding using said AAL5 PDU payload, and
 (d) segmenting said FB-AAL PDU into a plurality of variable length frames to generate said output frame stream; and (2) means for converting an input frame stream into an output cell stream by
 (e) aggregating a group of frames of said input frame stream which corresponds to a FB-AAL PDU,
 (f) extracting from said frame group a user data payload of said FB-AAL PDU,
 (g) constructing an AAL5 PDU using said FB-AAL PDU payload, and
 (h) segmenting said AAL5 PDU into plurality of cells to generate said output cell stream.

9. A method for converting a stream of fixed size packets to a stream of variable sized packets, wherein said variable sized packet has a maximum size limit, said method comprising:

assembling a group of fixed size packets wherein a last packet of said group includes padding for the purposes of aligning a user data payload onto said group;

extracting from said group said user data payload, exclusive of said padding; and segmenting said user data payload into a plurality of variable sized packets to generate said variable sized packet stream.

10. The method according to claim 1, further comprising:

identifying a resource management cell in said input cell stream;

encapsulating said resource management cell into a resource management frame; and inserting said resource management frame into said output frame stream.

11. The method according to claim 10, wherein said encapsulating said resource management cell is performed by a frame-based ATM adaptation sub-layer.

12. The method according to claim 4, wherein converting an input cell stream into an output frame steam further comprises:

identifying a resource management cell in said input cell stream, encapsulating said resource management cell into a resource management flame; and inserting said resource management frame into said output frame stream.

13. The apparatus according to claim 5, further comprising:

a resource cell management module, wherein said resource cell module identifies a resource management cell in said input stream, encapsulates said resource management cell into a resource management frame and inserts said resource management frame into said output frame stream.

14. The apparatus according to claim 8, wherein said means for converting an input cell stream into an output frame stream further comprises:

identifying a resource management cell in said input cell stream;

encapsulating said resource management cell into a resource management frame; and inserting said resource management frame into said output frame stream.

15. The method according to claim 9, further comprising:

identifying a resource management fixed size packet in said stream of fixed size packets;

encapsulating said resource management fixed size packet into a resource management variable sized packet; and inserting said resource management variable sized packet into said variable sized packet stream.

16. A method for converting cell-based resource management ATM traffic to frame-based resource management ATM traffic, comprising:

identifying a resource management cell in an input cell stream;

encapsulating said resource management cell into a resource management frame by a frame-based ATM adaptation sub-layer; and generating an output variable length frame stream including said resource management frame.

17. Apparatus for converting cell-based resource management ATM traffic to frame-based resource management ATM traffic, comprising:

a resource cell management module, wherein said resource cell module identifies a resource management cell in said input stream, encapsulates said resource management cell into a resource management frame and inserts said resource management frame into said output frame stream consisting of variable length frames.

* * * * *